Patented May 4, 1943

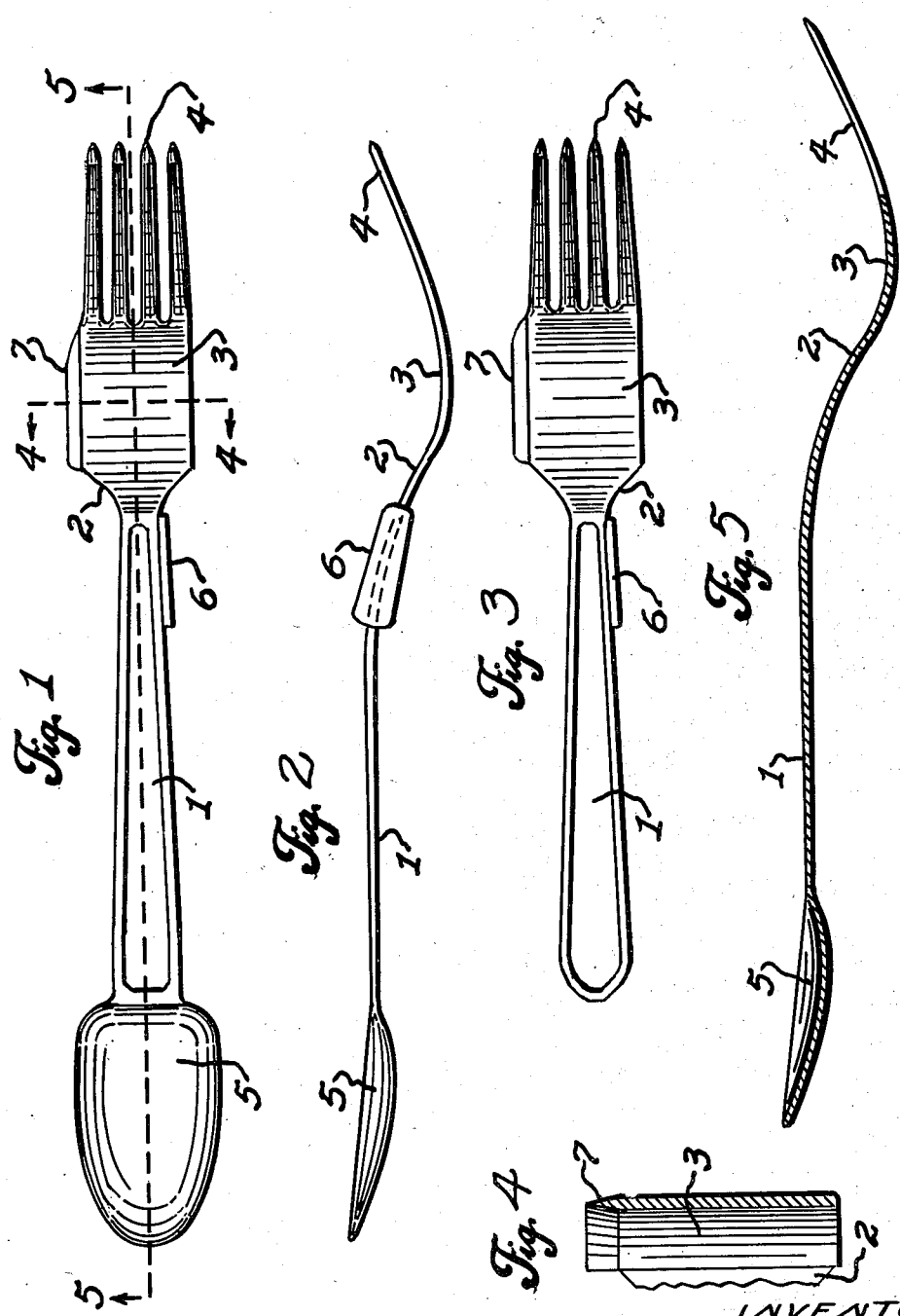

2,318,129

UNITED STATES PATENT OFFICE 2,318,129

COMBINATION KNIFE, FORK, AND SPOON

Thomas D. Torode, Detroit, Mich.

Application June 2, 1941, Serial No. 396,305

2 Claims. (Cl. 30—147)

To every one the thorough usefulness of the knife, fork and spoon for eating purposes generally, has always been well recognized, and the purpose of this invention is to provide a utensil whereby these three important elements are combined in a single structure, thus eliminating the necessity of the presence of three different utensils for this purpose.

There are countless advantages of this invention that may be derived from its use, one of these advantages is the fact that a person who is physically incapacitated, or who has the loss of one hand or arm, and possessing only one hand or arm to aid him in regularly eating and drinking, to such persons as these this invention is humbly dedicated.

Another advantage of the invention is that it is similarly advantageous to able-bodied persons in all walks of life, and particularly for students of schools and colleges, for hospitals and sanitariums, and the like, principally because the general use of the invention will save much time in serving meals and in cleansing the same after meals.

Still another advantage of the invention is that it is invaluable for camping, and would have an important value for extensive use by the Army and Navy.

The invention is very simple, and for this reason it may be manufactured at a cost that would permit a selling price well within reach of all, notwithstanding the fact that it may be artistically designed and exceedingly attractive in appearance.

With the foregoing in mind, it will become readily apparent that the invention possesses further advantages, all of which will be clearly revealed during the course of the following detailed description, illustrated throughout the accompaning drawing, and more fully pointed out in the subjoined claims.

With reference to the drawing:

Figure 1 is a top plan view of the complete invention.

Figure 2 is a side elevation of the view indicated in Figure 1.

Figure 3 is a top plan view of a modified form of the invention.

Figure 4 is an enlarged transverse section taken upon line 4—4 of Figure 1.

Figure 5 is a longitudinal section taken upon line 5—5 of Figure 1.

In further carrying out the invention, and with particular reference to Figure 1, the same comprises handle portion 1, being tapered as shown and having one of its ends terminating to neck 2, then extending and forming fork body 3, one end of said body terminating to a series of spaced apart tines 4.

The opposite end of handle portion 1 terminates to spoon bowl 5 as shown.

Finger pressure arm 6 is provided and is an integral part of handle portion 1. The complete structure is made of a single piece of suitable metal, preferably of stainless steel.

Knife blade portion 7 is a part of body 3.

It is undertsood that in order to use knife portion 7 adequate pressure may be exerted upon arm 6 for this purpose. The fork tines 4 and the spoon 5 are both used in the customary manner.

With reference to Figure 3 in which a modified form of the invention is shown, it is noted that the structure retains handle portion 1, neck 2, fork body 3, tines 4 and finger pressure arm 6. Spoon bowl 5 only being omitted.

In conclusion, let it be understood that the complete disclosure herewith is merely illustrative of the general principle of the invention sought to be protected by Letters Patent, and that any contemplated changes made therein, such as proportion or design, would fall directly within the scope of the claims.

Having thus fully described my invention, what I claim as new is:

1. In a table utensil of the character described, the combination of an integral structure formed successively with a series of fork tines, a knife, a handle portion and a spoon, a finger pressure arm being arranged upon the handle portion in position to enable the application of manual force to said knife.

2. In a table utensil of the character described, the combination of an integral structure formed successively with a series of forked tines at one end, a solid portion of substantially the same width as the tines with a knife at one side, a tapering handle with a finger pressure arm on the side of its neck portion opposite to that upon which the knife is formed, and a spoon at the opposite end of the handle.

THOMAS D. TORODE.